United States Patent Office 3,661,950
Patented May 9, 1972

---

3,661,950
PROCESS FOR PRODUCING ALKANOIC ACIDS FROM NITROKETONES
John M. Larkin, Wappingers Falls, and Harry Chafetz, Poughkeepsie, N.Y., assignors to Texaco Inc., New York, N.Y.
No Drawing. Filed Nov. 18, 1970, Ser. No. 90,791
Int. Cl. C08h 17/36
U.S. Cl. 260—413                                     10 Claims

ABSTRACT OF THE DISCLOSURE

A process for preparing alkanoic acids from vicinal nitroalkanones which comprises contacting the vicinal nitroalkanone under non-aqueous conditions with a catalyst comprising a sulfonic acid cation exchange resin at temperatures of at least 100° C.

BACKGROUND OF THE INVENTION

This invention relates to a process for producing alkanoic acids from vicinal nitroalkanones.

Heretofore, many alkanoic acids were not easily available. Illustratively, a scarcity in commercial quantities existed of the odd numbered chain fatty acids from natural sources and their manufacture from relatively expensive initial reactants was required. One prior means of producing alkanoic acids is by oxidizing the corresponding alcohol or by employing a Grignard synthesis, both of which require relatively costly starting materials. Further, the products obtained by these prior methods contained impurities which were difficult to remove thereby requiring extensive purification steps which further added to the cost of the product.

More recently, U.S. Pat. 3,415,856, assigned to the assignee hereof, teaches that alkanoic acids can be prepared from vicinal nitroketones by contacting with water in the presence of a mineral acid, a hydrocarbon sulfonic acid or a haloacetic acid at temperatures about 0° C. to 150° C. However, to recover the product acid from the reaction medium and catalyst involves costly filtration, extraction and stripping procedures.

A method has now been found whereby alkanoic acids can be produced in high yields which at the same time provides a process scheme that obviates extensive and expensive purification procedures.

Broadly, this invention contemplates a method of preparing alkanoic acids of the formula RCOOH, where R is an alkyl containing from 1 to 20 carbon atoms which comprises contacting a vicinal nitroketone corresponding to the formula:

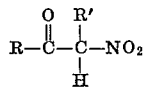

where R is an alkyl group having from 1 to 20 carbon atoms and where R' is hydrogen or an alkyl group having from 1 to 6 carbon atoms with a catalyst comprising a sulfonic acid cation exchange resin under non-aqueous conditions at a temperature of at least 100° C.

According to this invention, the contemplated alkanoic acids are derived from vicinal nitroketones corresponding to the above formula and include as starting materials 1-nitro-2-propanone, 1-nitro-2-butanone, 2-nitro-3-pentanone, 1-nitro-2-pentanone, 1-nitro-2-hexanone, 1-nitro-2-heptanone, 2-nitro-3-octanone, 1-nitro-2-octanone, 2-nitro-3-decanone, 1-nitro-2-decanone, 7-nitro-8-heptadecanone, 1-nitro-2-dodecanone, 3-nitro-4-pentadecanone, 1-nitro-2-pentadecanone, 5-nitro-6-eicosanone, 1-nitro-2-heptadecanone, 1-nitro-2-nondecanone and 1-nitro-2-heneicosanone. The illustrative vicinal nitroketones contemplated as starting materials and listed above can be prepared in accordance with the procedure described in U.S. Pat. 3,415,856.

More specifically, the process of this invention comprises contacting a vicinal nitroketone as hereinabove defined with a sulfonic acid cation exchange resin catalyst at a temperature of at least 100° C. The catalyst employed in the instant process represents a class of commercially available materials which are solids at room temperature and insoluble in hydrocarbon solvents. Illustrative of the catalysts are the polyalkarene polysulfonic acids including sulfonated polystyrene, sulfonated poly-α-methylstyrene and preferably a sulfonated styrenedivinylbenzene copolymer. We have found that a sulfonic acid cation exchange resin having a macroreticular structure sold under the tradename "Amberylst 15" by Rohm and Haas is particularly useful. The sulfonic acid cation exchange resin employed as the catalyst is highly active in converting vicinal nitroketones to alkanoic acids and is particularly desirable in that the catalyst is a solid and insoluble in the instant process thereby facilitating catalyst and product separation and recovery.

In accordance with the inventive process, the vicinal nitroketone is contacted with the catalyst in a weight ratio of nitroketone to catalyst of between about 10:1 and 1:10, under non-aqueous conditions. As mentioned above, the reaction temperature employed varies from at least 100° C. and up to 200° C. and preferably from about 110 to 180° C. for periods of from 0.1 to 48 hours. Temperatures below 100° C. cause excessive and prolonged reaction times and where the temperature is substantially below 100° C. no reaction at all, while temperatures above 200° C. are generally undesirable in that such conditions promote the formation of tars and resins. Processing temperatures above 200° C. also promote catalyst degradation in that desulfonation occurs leading to shortened catalyst life.

As mentioned above, conversion of the nitroketone to the alkanoic acid in the presence of the aforementioned catalyst and under the prescribed temperature conditions, is simultaneously undertaken under non-aqueous conditions. The vicinal nitroketone can itself be satisfactorily employed as the reaction medium where it is a non-viscous liquid at the reaction temperatures prescribed above. In those instances when the vicinal nitroketone is viscous or solid at the reaction temperature, non-aqueous diluents are employed. Applicable diluents include any non-reactive liquid hydrocarbon having a boiling point of at least 100° C. and up to about 250° C. including, for example, a wide range of $C_8$–$C_{18}$ alkanes illustrated by octane, nonane, dodecane, pentadecane and octadecane and alkylbenzenes such as toluene, xylene, ethylbenzene, isopropylbenzene, n-propylbenzene, diisopropylbenzene, cyclohexylbenzene and phenylbenzene. Preferred hydrocarbons are decane, xylene and ethylbenzene. Further, the use of non-aqueous conditions permits the reaction to proceed at higher temperatures while not requiring the processing to be conducted at superatmospheric pressures. The diluent is beneficially provided in amounts ranging from 5 to 98 weight percent based on the weight of the nitroketone and preferably in the range of from about 80 to 98 weight percent.

Specific examples of the alkanoic acids prepared according to the inventive process include ethanoic acid, propanoic acid, butanoic acid, pentanoic acid, hexanoic acid, heptanoic acid, octanoic acid, decanoic acid, undecanoic acid, pentadecanoic acid and eicosanoic acid. Yields of alkanoic acid provided by this process have been as high as 97 percent.

By employing the aforementioned sulfonic acid cation exchange resin catalyst in combination with the non-aqueous conditions, recovery of the alkanoic acid is facilitated and obviates extensive filtration, extraction and stripping procedures. Heretofore, alkanoic acids were recovered through the introduction of a plurality of extractants, such as ether, and the removal and stripping of the extractant led to multi-stage separations. In the instant case, the reaction products are composed of the desired alkanoic acid, catalyst and, when employed, the hydrocarbon medium. Recovery of the alkanoic acid proceeds by initial separation of the catalyst, after preferably first cooling the reaction mixture to a temperature below 100° C., such that the solid catalyst is recovered by simple filtration techniques. The alkanoic acid and hydrocarbons, when employed, are thereafter effectively separated by distillation. In those instances where the hydrocarbon has a higher boiling point than the acid product, the acid is recovered as the distillate. Conversely, the hydrocarbon is recovered as the distillate and the substantially pure acid product is recovered as the residue when the acid processes the higher boiling point.

In order to more fully illustrate the nature of our invention and manner of practicing the same, the following examples are presented.

EXAMPLE I

A solution of 5.0 grams of 1-nitro-2-hexadecanone in 50 milliliters of xylene was stirred at a refluxing temperature of 135° C. along with 2.0 grams of a sulfonic acid cation exchange resin sold under the trademark Amberlyst 15 for 24 hours. The mixture was allowed to cool to room temperature and the catalyst separated from the mixture by filtration. Xylene was recovered from the filtrate by distillation at 50–60° C. and 20–30 mm. pressure. The residue consisted of pentadecanoic acid and a small amount of residual xylene. Pentadecanoic acid, identified by its infra-red spectrum, was recovered by cooling the residue to room temperature and separating the crystallized solids by filtration.

EXAMPLE II

A solution of 5.0 grams of 1-nitro-2-hexadecanone in 50 milliliters of toluene was stirred at a refluxing temperature of 110° C. and 2.0 grams of the catalyst used in Example I for 48 hours. The mixture was allowed to cool to room temperature and the catalyst removed by filtration. The filtrate was distilled under vacuum, toluene was recovered as the distillate and 4.05 grams of pentadecanoic acid were recovered as the residue.

EXAMPLE III

A solution of 2.0 grams of 1-nitro-2-hexadecanone in 100 milliliters of n-decane was stirred at a refluxing temperature of 172° C. along with 1.0 gram of the catalyst used in Example I for 18 hours. The mixture was subsequently allowed to cool to room temperature and the catalyst was removed by filtration. The filtrate was distilled under vacuum (0.4–1.6 mm.), n-decane was recovered as the distillate and 1.65 grams, corresponding to a yield of 97%, of pentadecanoic acid was recovered as the residue.

EXAMPLE IV

A solution of 0.5 gram of 1-nitro-2-pentanone in 25 milliliters of chloroform was stirred at a refluxing temperature of 61° C. along with 0.1 gram of the catalyst employed in Example I for 3 hours. Subsequent separation of the catalyst by filtration and chloroform by evaporation provided a residue identified by infra-red to be the starting material 1-nitro-2-pentanone.

A solution of 0.5 gram of 2-nitro-3-pentanone in chloroform refluxed in the presence of the catalyst employed in Example I for six hours resulted in a residue of starting material.

We claim:

1. A method of preparing alkanoic acids of the formula RCOOH where R is an alkyl containing from 1 to 20 carbon atoms which comprises contacting a vicinal nitroketone corresponding to the formula:

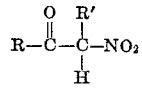

where R is an alkyl group having from 1 to 20 carbon atoms and where R' is hydrogen or an alkyl group having from 1 to 6 carbon atoms with a catalyst comprising a sulfonic acid cation exchange resin under non-aqueous conditions at a temperature of at least 100° C.

2. A method according to claim 1 wherein said temperature is from about 110° to 180° C.

3. A method according to claim 1 wherein said catalyst is a polyalkarene polysulfonic acid.

4. A method according to claim 1 wherein said catalyst is a sulfonated styrene-divinylbenzene copolymer.

5. A method according to claim 1 wherein said catalyst is sulfonated polystyrene.

6. A method according to claim 1 wherein said catalyst is sulfonated poly-α-methylstyrene.

7. A method according to claim 1 wherein said contacting is conducted in the presence of a non-reactive liquid hydrocarbon having a boiling point of at least 100° C. and up to about 250° C.

8. A method according to claim 7 wherein said hydrocarbon is selected from the group consisting of decane, xylene and ethylbenzene.

9. A method according to claim 1 wherein said vicinal nitroketone is 1-nitro-2-hexadecanone.

10. A method according to claim 1 wherein said alkanoic acid is pentadecanoic acid.

References Cited

UNITED STATES PATENTS 3,518,302 6/1970 Ellis _____ 260—526
3,586,704 6/1971 Ellis _____ 260—404

LEWIS GOTTS, Primary Examiner

E. G. LOVE, Assistant Examiner

U.S. Cl. X.R.

260—540, 541